(12) United States Patent
Ogawa

(10) Patent No.: US 7,072,889 B2
(45) Date of Patent: Jul. 4, 2006

(54) DOCUMENT RETRIEVAL USING INDEX OF REDUCED SIZE

(75) Inventor: Yasushi Ogawa, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 565 days.

(21) Appl. No.: 10/207,816

(22) Filed: Jul. 31, 2002

(65) Prior Publication Data
US 2003/0033297 A1 Feb. 13, 2003

(30) Foreign Application Priority Data
Aug. 10, 2001 (JP) .................................. 2001-243854

(51) Int. Cl.
G06F 7/00 (2006.01)

(52) U.S. Cl. .................... 707/5; 707/101; 707/104.1

(58) Field of Classification Search ............ 707/1–5, 707/7, 9, 10, 100–104.1; 704/1–4, 7–10, 704/251, 255, 257; 715/500, 500.1, 501.1, 715/513–515, 530–536, 540; 382/173, 177, 382/181, 190, 229–231
See application file for complete search history.

(56) References Cited

U.S. PATENT DOCUMENTS

| | | | |
|---|---|---|---|
| 5,020,019 A | | 5/1991 | Ogawa |
| 5,535,382 A | | 7/1996 | Ogawa |
| 6,006,221 A | * | 12/1999 | Liddy et al. .................... 707/5 |
| 6,246,791 B1 | * | 6/2001 | Kurzweil et al. ........... 382/162 |
| 6,546,383 B1 | | 4/2003 | Ogawa |
| 6,546,401 B1 | * | 4/2003 | Iizuka et al. ............. 707/104.1 |
| 6,714,927 B1 | | 3/2004 | Ogawa |

| | | | |
|---|---|---|---|
| 2003/0200211 A1 | * | 10/2003 | Tada et al. |

FOREIGN PATENT DOCUMENTS

| | | | |
|---|---|---|---|
| JP | 7-85033 | | 3/1995 |
| JP | 2000-67070 | | 3/2000 |
| JP | 2000-231563 | * | 8/2000 |
| JP | 2000-348059 | | 12/2000 |

OTHER PUBLICATIONS

Joon Ho Lee and Joong Soo Ahn, "Using n–Grams for Korean Text Retrieval", 1996, SIGIR Forum (USA), ACM Inc., pp. 216–224.*

(Continued)

*Primary Examiner*—Greta Robinson
*Assistant Examiner*—Harold E. Dodds, Jr.
(74) *Attorney, Agent, or Firm*—Dickstein Shapiro Morin & Oshinsky LLP

(57) ABSTRACT

A document retrieval apparatus for retrieving a document including a query character string among a plurality of registered documents includes a text separating unit which separates the registered documents and a query character string into n-grams and words, an n-gram index which stores therein information about occurrences of n-grams appearing in the registered documents on a n-gram-specific basis, a word-boundary-position index which stores therein information about occurrences of word boundaries appearing in the registered documents in a compressed form, a character-string-based search unit which identifies one or more registered documents including the query character string by looking up one or more n-grams of the query character string in the n-gram index, and a word-based search unit which checks whether the query character string appears as word in the one or more identified registered documents by looking up one or more words of the query character string in the word-boundary-position index, thereby identifying a registered document including the query character string as word.

10 Claims, 11 Drawing Sheets

OTHER PUBLICATIONS

Joon H. Lee, et al., "Using n–Grams for Korean Text Retrievel", Korea Research and Development Information Center, pp. 216–224.

Ogawa et al., An Efficient Document Retrieval Method Using N–Gram Indexing, Systems & Computers in Japan, Wiley, Hoboken, New Jersey; vol. 33, No. 2, Feb. 2002, pp. 54–63.

Ogawa et al., Overlapping Statistical Segmentation for Effective Indexing of Japanese Text, Information Processing & Management, Elsevier, Barking, Great Britain, vol., 35, No. 4, Jul. 1999, pp. 463–480.

Tehan et al., A Compression–Based Algorithm for Chinese Word Segmentation, Computational Linguistics, Online, vol. 26, No. 3, pp. 375–393.

Zobel et al., Efficient Retrieval of Partial Documents, Information Processing & Management, Elsevier, Barking, Great Britain, vol. 31, No. 3, May 1995, pp. 361–377.

* cited by examiner

FIG.3A

彼女の携帯電話
(kano jo no kei tai den wa)

DOCUMENT1

FIG.3B

／彼女／の／携帯／電話／
(/kano jo/ no/ kei tai/ den wa/)

RESULT OF MORPHOLOGICAL ANALYSIS OF DOCUMENT1

FIG.3C

| | |
|---|---|
| 彼女 (kano jo) : | {1, 1, (1)} |
| 女の (jo no) : | {1, 1, (2)} |
| の携 (no kei) : | {1, 1, (3)} |
| 携帯 (kei tai) : | {1, 1, (4)} |
| 帯電 (tai den) : | {1, 1, (5)} |
| 電話 (den wa) : | {1, 1, (6)} | n-GRAM INDEX

WORD-BOUNDARY-POSITION INDEX

POSITION OF OCCURRENCE

DIFFERENTIAL

VARIABLE-LENGTH CODE

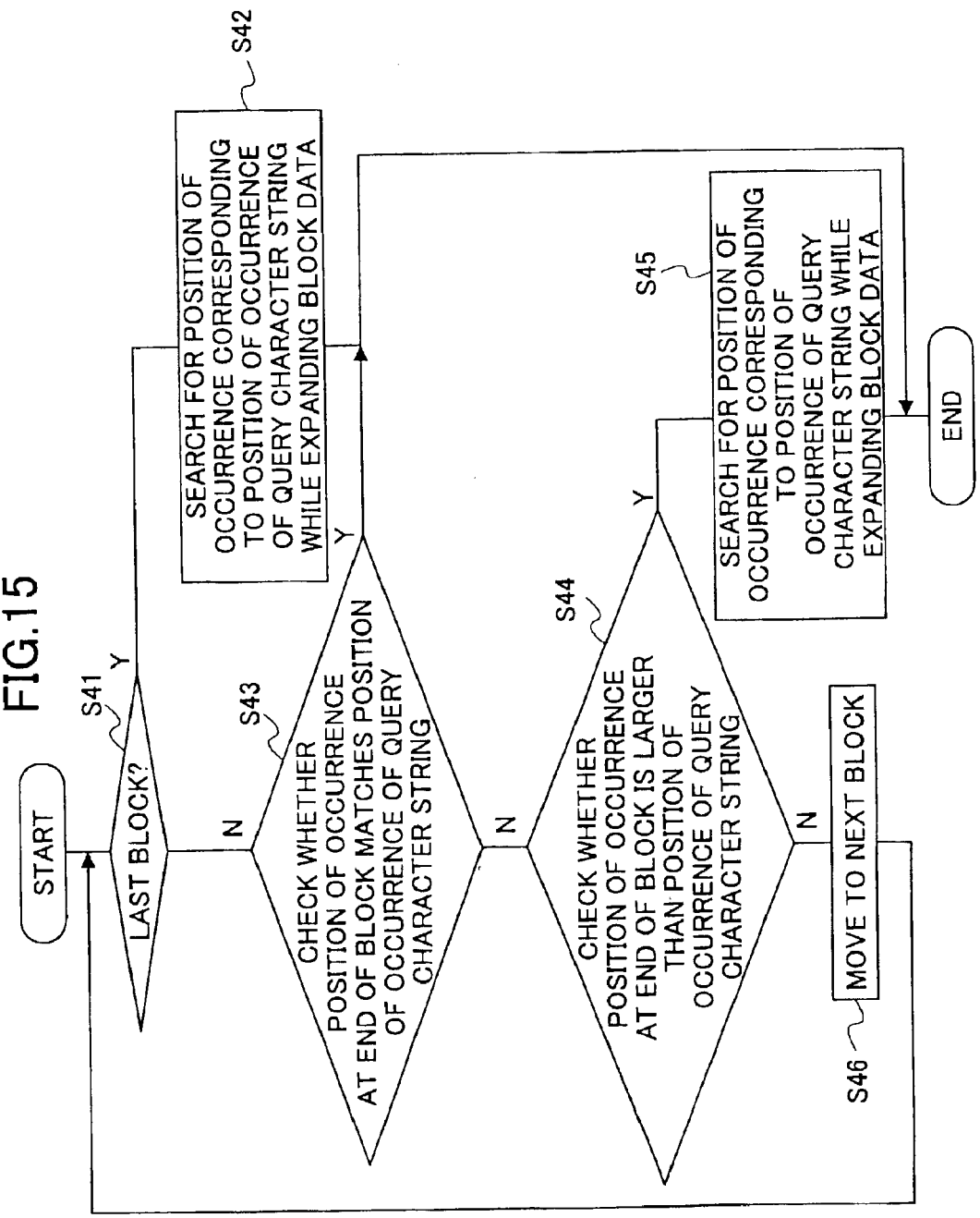

DOCUMENT RETRIEVAL USING INDEX OF REDUCED SIZE

BACKGROUND OF THE INVENTION

1. Field of the Invention

The present invention generally relates to document retrieval apparatuses, document retrieval methods, programs, and computer-readable media having the programs embodied therein, and particularly relates to a document retrieval apparatus, a document retrieval method, a program, and a computer-readable medium having the program embodied therein for retrieving a document including a query character string from a set of registered documents.

2. Description of the Related Art

Document retrieval methods of retrieving a desired document from a set of registered documents include a character-string-based retrieval method and a word-based retrieval method.

The character-string-based retrieval method searches for a document including a character string that matches a character string specified by a user (hereinafter referred to as a query character string). In order to increase the speed of a character-string-based retrieval method, a known method utilizes an n-gram index that is prepared in advance by using a n-character set as an index unit. The n-gram index records the identifiers of relevant documents and the position of occurrences in the documents on an index-by-index basis.

The word-based retrieval method searches for a document including a word that matches a character string specified by a user. In order to enhance the speed of word-based retrieval, a known method utilizes a word index that is prepared in advance by using a document word as an index unit. The word index records the identifiers of relevant documents and the position of occurrences in the documents on an index-by-index basis.

Either retrieval method has its own drawbacks. In the case of the character-string-based retrieval method, a search is conducted by ignoring boundaries of words, resulting in search results including documents that are not appropriate in light of the user's intension. For example, use of the query character string "taiden" (electrification) may result in "ketaidenwa" (cellular phone) being retrieved.

In the case of the word-based retrieval method, there is a need to extract words by morphological analysis at the time of generating indexes because word boundaries are not explicitly indicated in the Japanese sentences. At the level of currently available technology, however, morphological analysis is not free from errors. Such error in morphological analysis can be a cause of search error. For example, morphological analysis should convert "tokyotoniarukiyomizudera" into "/to/kyoto/ni/aru/kiyomizudera/". If an erroneous analysis result "/tokyo/to/ni/aru/kiyomizu/dera/" is produced, the sentence "tokyotoniarukiyomizudera" cannot be retrieved when the query character string is "kyoto".

In order to avoid problems as described above, the system may be provided with both of these retrieval methods, so as to allow users to select one of the retrieval method according to user needs. Japanese Patent Laid-open Application No. 2000-67070 discloses such a prior-art retrieval method. In this document, special section-mark characters are inserted between words at the time of sentence registration, and an n-gram is extracted from the data having the section-mark characters inserted therein, followed by generating indexes. In so doing, n-grams formed by connecting words across the section-mark character are also extracted and registered as indexes. When a user selects the word-based retrieval method, the n-grams including the section-marks therein are not ignored by the search process. On the other hand, when the character-string-based retrieval method is selected, the n-grams including the section-marks therein are ignored in the search process.

Japanese Patent Laid-open Application No. 7-85033 discloses another prior-art technology. In this technology, documents having characters occurring therein are identified on character-specific basis, and the positions of occurrences in the documents are recorded. Further, a flag is recorded that indicates whether the position of occurrence is at the beginning of a word or at the end of a word. At the time of search, a character-string-based search is achieved based on the positions of character-specific occurrences, and, also, a word-based search is attained by referring to the flag indicative of the beginning or end of words.

The scheme taught by Japanese Patent Laid-open Application No. 2000-67070 has drawbacks as follows. According to this disclosure, the word boundaries are represented by section-mark characters. Since characters are generally represented by fixed length codes (e.g., 2 bytes when Unicode (UCS2) is used), this method is not applicable where any possible values are treated as characters having meanings.

The scheme taught by Japanese Patent Laid-open Application No. 7-85033 has the following drawbacks. Since the character-string-based retrieval operates based on character search, search speed is slow compared with when the n-gram index is used.

Problems common to both schemes are as follows. When a morphological analysis system for separating words is updated (or a dictionary is updated), the position of boundaries may change, which results in the need for regeneration of the entire index. Consequently, maintenance of indexes is time consuming.

In consideration of this, a document-retrieval method has been presented that provides a word-based retrieval by using a word-boundary position index that is different from the n-gram index used for character-string-based retrieval, thereby achieving high-speed retrieval and providing for easy maintenance of index. This method was assigned to the assignee of this application.

When such a word-boundary position index is used, however, the index size may become undesirably large since the word-boundary position index needs to record a large number of positions of word occurrences.

Accordingly, there is a need for a document-retrieval apparatus, a document-retrieval method, and a computer-readable medium having the program recorded therein that can reduce the size of a word-boundary position index.

Also, there is a need for a document-retrieval apparatus, a document-retrieval method, and a computer-readable medium having the program recorded therein that can enhance search speed.

SUMMARY OF THE INVENTION

It is a general object of the present invention to provide a document-retrieval apparatus, a document-retrieval method, and a computer-readable medium having the program recorded therein that substantially obviate one or more of the problems caused by the limitations and disadvantages of the related art.

It is another and more specific object of the present invention to provide a document-retrieval apparatus, a document-retrieval method, and a computer-readable medium having the program recorded therein that can reduce the size of a word-boundary position index.

In order to achieve the above objects according to the present invention, a document retrieval apparatus for retrieving a document including a query character string among a plurality of registered documents includes a text separating unit which separates the registered documents and a query character string into n-grams and words, an n-gram index which stores therein information about occurrences of n-grams appearing in the registered documents on a n-gram-specific basis, a word-boundary-position index which stores therein information about occurrences of word boundaries appearing in the registered documents in a compressed form, a character-string-based search unit which identifies one or more registered documents including the query character string by looking up one or more n-grams of the query character string in said n-gram index, and a word-based search unit which checks whether the query character string appears as word in said one or more identified registered documents by looking up one or more words of the query character string in said word-boundary-position index, thereby identifying a registered document including the query character string as word.

In the apparatus described above, the function of word-based search is achieved by the word-boundary-position index that is separate from the n-gram index used for the purpose of character-string-based search. The present invention is thus applicable to any character codes, and provides for high-speed search and the easier maintenance of indexes. Further, since the information about occurrences is stored in the word-boundary-position index in a compressed form, the index can be made small in size.

According to another aspect of the present invention, the document retrieval apparatus as described above is such that said word-boundary-position index is comprised of a plurality of blocks that separately contain positions of the occurrences of word boundaries in the compressed form.

Since the positions of occurrences of word boundaries are stored in the separate blocks, a time required for expansion is reduced compared with the case in which the entirety of the word-boundary-position index is compressed in a straightforward manner that requires a lengthy expansion time, at the time of search.

According to another aspect of the present invention, the document retrieval apparatus as described above is such that the plurality of blocks have a fixed block length.

With this provision, use of blocks to store the positions of occurrences of word boundaries becomes easier to implement.

According to another aspect of the present invention, the document retrieval apparatus as described above is such that the plurality of blocks have a fixed block length, except for a block positioned last in a series of the plurality of blocks that has a length less than the fixed block length.

This makes it possible to further reduce the size of indexes.

According to another aspect of the present invention, the document retrieval apparatus as described above is such that each block includes compressed data of a position of a given occurrence and compressed data of differentials between occurrence positions and preceding occurrence positions with respect to occurrences other than the given occurrence, said given occurrence being either a first occurrence in the block or a last occurrence in the block.

In the apparatus as described above, only the data at the beginning or end of a block is expanded until the block is identified that has the possibility of the position of occurrence of the query character string being included therein. The amount of data needing expansion can thus be reduced.

According to another aspect of the present invention, the document retrieval apparatus as described above is such that each block includes non-compressed data of a position of a given occurrence and compressed data of differentials between occurrence positions and preceding occurrence positions with respect to occurrences other than the given occurrence, said given occurrence being either a first occurrence in the block or a last occurrence in the block.

Since the position of the first occurrence or the last occurrence that is not in the form of differential data is stored without data compression, the search speed can be further enhanced.

According to another aspect of the present invention, the document retrieval apparatus as described above is such that each block includes data of a position of a last occurrence in the block and compressed data of differentials between occurrence positions and preceding occurrence positions with respect to occurrences other than the last occurrence, except for a last block that is not provided with the data of a position of a last occurrence.

With this provision, search speed can be enhanced while providing for a reduction of data amount.

According to another aspect of the present invention, the document retrieval apparatus as described above is such that said n-gram index stores therein the information about occurrences of n-grams in a compressed form that is obtained by applying a coding method different from a coding method applied to said word-boundary-position index.

With this provision, efficient data compression can be achieved.

Further, the objects as previously noted can also be achieved by a method of retrieving a document including a query character string among a plurality of registered documents. The method includes the steps of separating the registered documents and a query character string into n-grams and words, storing, in an n-gram index, information about occurrences of n-grams appearing in the registered documents on a n-gram-specific basis, storing, in a word-boundary-position index, information about occurrences of word boundaries appearing in the registered documents in a compressed form, identifying one or more registered documents including the query character string by looking up one or more n-grams of the query character string in said n-gram index, and checking whether the query character string appears as word in said one or more identified registered documents by looking up one or more words of the query character string in said word-boundary-position index, thereby identifying a registered document including the query character string as word.

Moreover, the objects as previously noted can also be achieved by a computer-readable record medium having a program embodied therein that performs the steps as described above.

Other objects and further features of the present invention will be apparent from the following detailed description when read in conjunction with the accompanying drawings.

BRIEF DESCRIPTION OF THE DRAWINGS

FIGS. 3A through 3D are drawings showing examples of a registration process;

FIG. 15 is a flowchart of a process of finding the position of occurrence in the word-boundary-position index that corresponds to the position of occurrence of a query character string found by an n-gram-index search.

DESCRIPTION OF THE PREFERRED EMBODIMENTS

In the following, embodiments of the present invention will be described with reference to the accompanying drawings.

Figure 1:
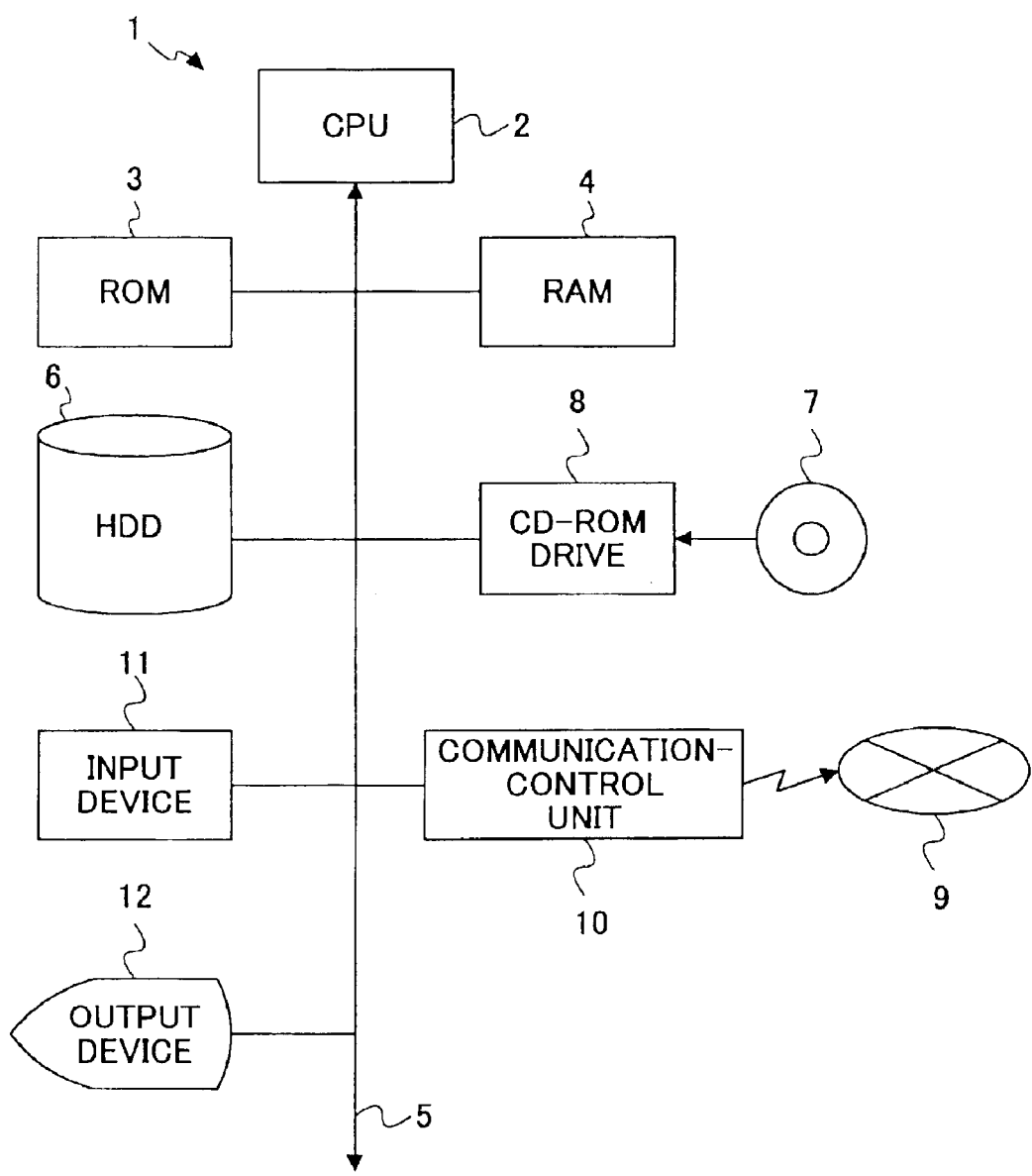
FIG. 1 is a block diagram showing the schematic hardware configuration of a document-retrieval apparatus according to the present invention.

FIG. 1 is a block diagram showing the schematic hardware configuration of a document-retrieval apparatus according to the present invention.

A document-retrieval apparatus 1 of FIG. 1 includes a CPU (central processing unit) 2 for attending to centralized control of each unit of the document-retrieval apparatus 1. The CPU 2 is connected via a bus 5 to a ROM (read only memory) 3 having BIOS and the like stored therein and a RAN (random access memory) 4 for storing various data in a rewritable manner. The bus 5 is also connected via an I/O interface (not shown) to a HDD (hard disk drive) 6 serving as an external data storage, a CD-RAM drive 8 for reading a CD-ROM (compact disk ROM) 7, a communication-control device 10 for attending to communication between the document-retrieval apparatus 1 and a network 9, an input device 11 comprised of a keyboard and mouse or the like, and an output device 12 comprised of a CRT (cathode ray tube), a LCD (liquid crystal display), or the like.

The RAM 4 can store various data in a rewritable manner so as to provide a work area for the CPU 2, and serves as an input buffer, an analysis buffer, etc. The HDD 6 stores therein program files that contain various programs.

The CD-ROM 7 of FIG. 1 may embody a memory medium of the present invention, and stores therein a program. The CPU 2 reads the program stored in the CD-ROM 7 by the CD-ROM drive 8, and installs the program in the HDD 6. This installation allows the document-retrieval apparatus 1 to perform various processes as will be described later.

As the record medium, various types of medias other than the CD-ROM 7 may be used, including optical disks such as DVDs, magneto-optical disks, magnetic disks such as floppy disks, semiconductor memories, and the like. Further, the program may be downloaded from the network 9 such as the Internet via the communication control device 10 to be installed in the HDD 6. In such a case, the memory device-having the program stored therein in the transmission-side server also constitutes a memory medium of the present invention. The program may operate on a predetermined operation system, and may let the operation system take over some of the processes that will be described later. Further, the program may be incorporated as part of application software such as a word-processor program, or may be incorporated as part of a set of program files constituting the operation system.

Figure 2:
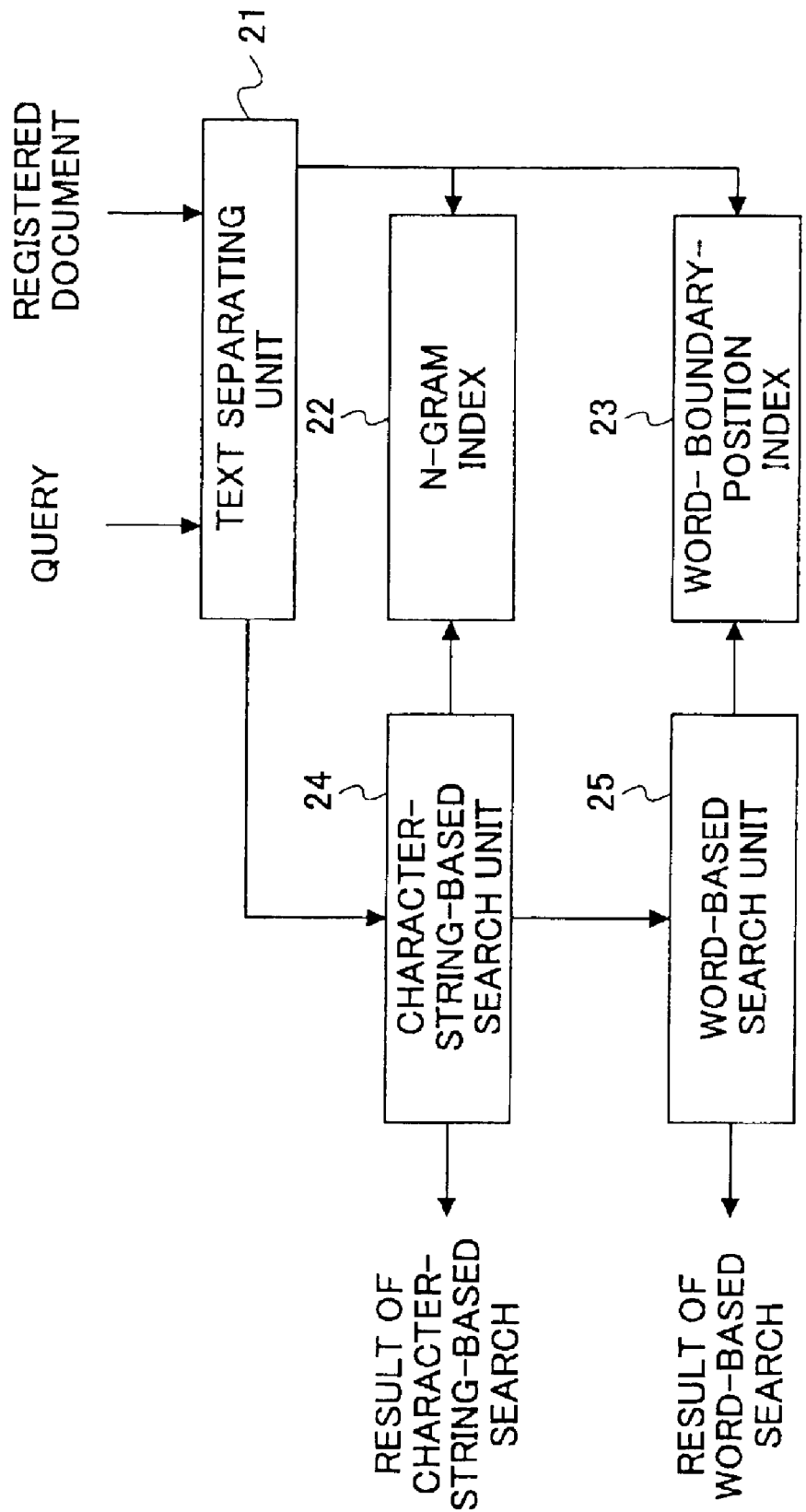
FIG. 2 is a block diagram showing functional blocks representing functions performed by the document-retrieval apparatus.

In the following, a description will be given with regard to various processes that are performed by the CPU 2 of the document-retrieval apparatus 1 based on the program. The document-retrieval apparatus 1 of the present invention achieves various functions by using the CPU 2 that operates based on the program. FIG. 2 is a block diagram showing functional blocks representing the functions performed by the document-retrieval apparatus 1.

In FIG. 2, a text separating unit 21 separates a text into n-grams and words when the text is given as part of a query or given as a registered document that is entered by a user through-the input device 11 or the CD-ROM drive 8. Separation into words is made by use of morphological analysis. Any known methods of morphological analysis may be used for this purpose.

An n-gram index 22 stores therein information about n-grams separated from registered documents for the retrieval purpose.

A word-boundary-position index 23 stores therein information about occurrences of word boundaries generated by separating registered documents for the retrieval purpose.

A character-string-based search unit 24 searches for a document inclusive of a query character string by use of the n-gram index 22 based on the n-grams separated from the query character string by the text separating unit 21.

A word-based search unit 25 determines whether a query string is occurring as a word in the results of character-string-based search made by the character-string-based search unit 24. This determination is made by using the word-boundary-position index 23.

In the following, a description will be given of a registration process that is performed by the CPU 2 of the document-retrieval apparatus 1 based on the program. The text separating unit 21, the n-gram index 22, and the word-boundary-position index 23 are used together to perform the registration process. In the registration process, a document that is given is separated into n-grams and words by the text separating unit 21, and information about the occurrences is stored in the n-gram index 22 and the word-boundary-position index 23. FIGS. 3A through 3D are drawings showing examples of the registration process.

FIG. 3A shows the contents of a registered document DOCUMENT1, in which a Japanese language sentence is shown together with an English-letter transliteration for the sake of explanation. FIG. 3B shows an outcome of morphological analysis applied to the document DOCUMENT1. As the search unit is a bi-gram (i.e., a two character set: n-gram of n=2) in this example, this document is separated into bi-grams such as "keitai" and "taiden", thereby generating the n-gram index 22 as shown in FIG. 3C. In FIG. 3C, character strings on the left-hand side (e.g., "keitai") represents a bi-gram that is the unit of search, and the numbers on the right-hand side are a document identifier having this unit of search included therein, the number of occurrences in the identified document, and positions of the occurrences (identifying the position by an ordinal number that starts from 1 at the beginning of the document). For example, {1, 1, (5)} of "taiden" indicates that one occurrence is found in the document DOCUMENT1, and the position of the occurrence is at the fifth character. It should be noted that the n-gram index 22 may be configured by using n-grams other than the bi-grams of n=2. The factor n may even be changed according to the types of characters. Since the amount of data to be searched is large, it is preferable to compress the data to make it compact. A method of compressing the n-gram index 22 may be found, for example, in Japanese Patent Laid-open Application 2000-348059.

FIG. 3D shows the positions of word boundaries obtained as a result of morphological analysis by the word-boundary-position index 23. The notation of data is the same as in the case of the n-gram index 22. {1, 5, (1, 3, 4, 6, 8)} means that a total of five occurrences are found in the document DOCUMENT1 at the positions of 1st, 3rd, 4th, 6th, and 8th characters. The last position belonging to the 8th character corresponds to the end position of the last word.

Since there is a need to record a large number of positions of word occurrences in the word-boundary-position index 23, it is preferable to compress the information recorded in the word-boundary-position index 23. In the following, a description will be given of the compression of the word-boundary-position index 23.

Figure 4:
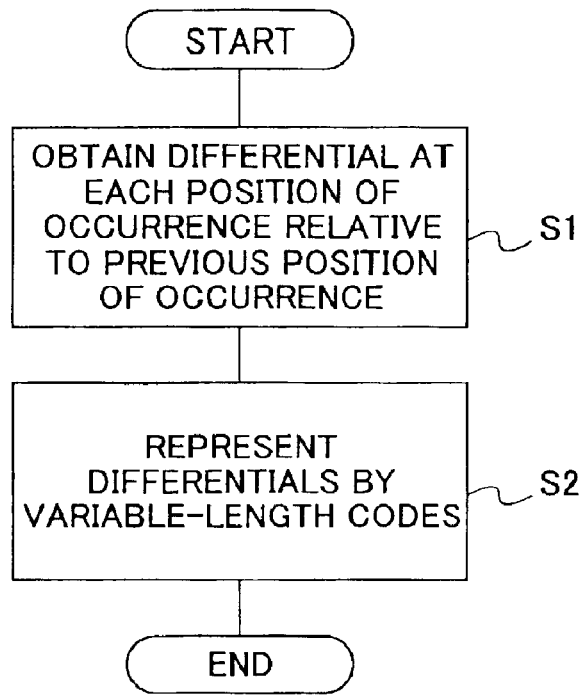
FIG. 4 is a flowchart of a compression process.

Among the information recorded in the word-boundary-position index 23, the positions of word-boundary occurrences in the document particularly require a large amount of data. FIG. 4 is a flowchart of a compression process.

At step S1, a differential between the current position of occurrence and the preceding position of occurrence is obtained. At the beginning, the receding position of occurrence is regarded as "0".

At step S2, the differential of the position of occurrence is represented by use of variable-length codes.

Figure 5A:
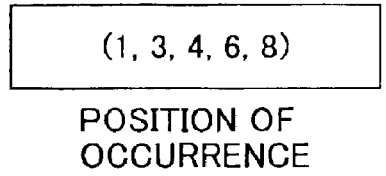
FIG. 5A is an illustrative drawing showing the positions of occurrences.
Figure 5B:
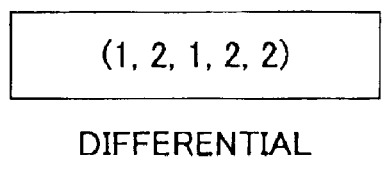
FIG. 5B is an illustrative drawing showing the differentials of the position of occurrence.
Figure 5C:
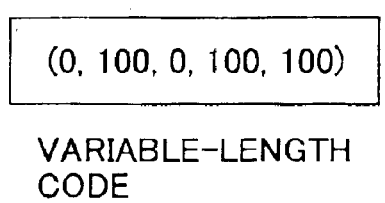
FIG. 5C is an illustrative drawing showing results obtained by applying variable-length coding to the differentials

In the example of the word-boundary-position index 23 shown in FIG. 3D, the positions of occurrences are (1, 3, 4, 6, and 8). FIG. 5A shows the positions of occurrences, and FIG. 5B illustrates the differentials of the position of occurrence. FIG. 5C demonstrates the results obtained by applying variable-length coding to the differentials. In this example, γ coding is used as the variable-length coding, which is described in I. H. Witten et al, *"Managing Gigabytes* (Second Edition)," Morgan Kaufmann, p.p. 117).

In what follows, a description will be given with regard to the character-string-based search that is performed by the CPU 2 of the document-retrieval apparatus 1 based on the program. The character-string-based search is performed by the character-string-based search unit 24. In this character-string-based search, a document that includes a query character string is determined by using information about occurrences alone or information about occurrences plus positions of the occurrences regarding the n-grams separated by the text separating unit 21. The example of FIGS. 3A through 3D will be used to explain the character-string-based search in the following.

When "tai den" is a query character string, the text separating unit 21 extracts "tai den" since this query character string is of itself a bi-gram. The character-string-based search unit 24 searches the n-gram index 22, and finds that "tai den" appears in the document DOCUMENT1, thereby producing a search result indicative of the document DOCUMENT1. If the query character string is "kei tai den wa", the text separating unit 21 extracts three bi-grams, i.e., "kei tai", "tai den", and "den wa". The character-string-based search unit 24 then identifies a document that includes all of these bi-grams, and produces a search result indicative of this document if this document has these bi-grams appearing in successive positions. In this example, the positions of occurrences for "kei tai", "tai den", and "den wa" are 4, 5, and 6, respectively, in successive positions. It is thus ascertained that "kei tai den wa" occurs at the position 4 in the document DOCUMENT1, so that the document DOCUMENT1 is identified as a search result.

Figure 6:
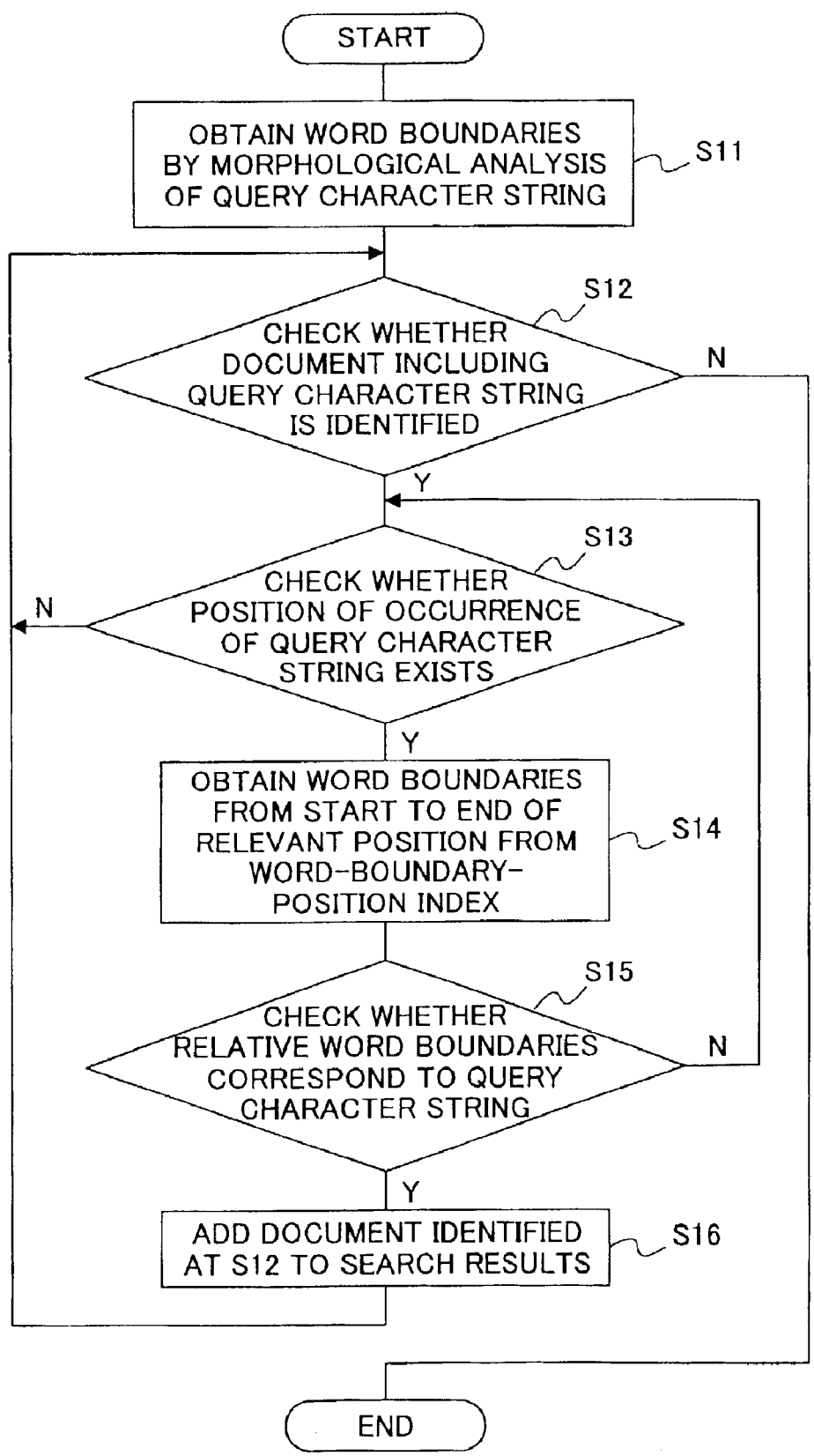
FIG. 6 is a flowchart showing a process of word-based search.

In the following, a description will be given with regard to the word-based search that is performed by the CPU 2 of the document-retrieval apparatus 1 based on the program. The word-based search unit 25 performs the word-based search. In this word-based search, a check is made as to whether an occurrence of a query character string obtained by the character-string-based search unit 24 is an occurrence as a word. FIG. 6 is a flowchart showing a process of the word-based search.

At step S11, a query character string is subjected to morphological analysis to identify word boundaries therein.

At step S12, a search for the query character string is conducted to identify a document that includes the query character string. Here, if the procedure has come back from step S13, a next document that includes the query character string is identified. If no document is found (N at step S12), the procedure comes to an end.

At step S13, the position of occurrence of the query character string is obtained with respect to the document found at step S12. Here, if the procedure has come back from step S14, a next position of occurrence of the query character string is obtained. If no position is found (N at step S13), the procedure goes back to S12.

At step S14, the word boundaries that are included from the beginning to the end of the position of occurrence obtained at step S13 are obtained from the word-boundary-position index 23.

At step S15, a check is made as to whether the relative positions of word boundaries obtained at step S14 corresponds to the word boundaries of the query character string obtained at step S11. If they match (Y at step S15), the document identified at step S12 is added to the results of the search (step S16), followed by the procedure going back to step S12. If the relative positions do not match the word boundaries of the query character string (N at step S15), the procedure goes back to S13.

A detailed explanation will be given here with reference to an example of the query character string "tai den". The result "tai den" is obtained by morphological analysis, and the word boundaries in this case are 1st and 3rd characters (i.e, the position of the beginning is the 1st character, and the end position is the length of the word (i.e., 2 characters) plus the position of the beginning). When a search for the character string is conducted and finds the document DOCUMENT1, the positions of occurrences are identified as the 5th character through 7th character. In this document, however, the word boundaries are at the 4th and 6th characters, and do not match the above word boundaries. Other positions of occurrences or documents cannot be found, so that the word-based search ends with the result of search indicative of no identified document. Namely, "tai den" does not appear as a word.

A further description will be given with reference to another example that uses the query character string "kei tai den wa". The results "kei tai" and "den wa" are obtained by morphological analysis, and the word boundaries in this case are 1st, 3rd, and 5th characters. When a search for the character string is conducted and finds the document DOCUMENT1, the positions of occurrences are identified as the 4th character through 8th character. The word boundaries are at the 4th, 6th, and 8th characters in the vicinity of the occurrence, and match the word boundaries of the query character string. Therefore, the document DOCUMENT1 is added to a search result. In this method, the word boundaries are represented by ordinal numbers that are obtained by counting characters from the beginning of the document, which eliminates a need for use of special characters, so that this method is applicable to any character codes. Since the word boundaries are generated and managed separately from the n-gram index for the character-string-based search, it suffices to remake only the word-boundary position index at the time the morphological analysis system is changed. This reduces the word load on the maintenance of indexes.

Since the word-boundary-position index 23 separate from the n-gram index 22 for the character-string-based search is used to conduct the word-based search, universal applicability to any character codes can be achieved. Further, high-speed search is attained, and the maintenance of indexes becomes easier. Since information about occurrences is recorded in the word-boundary-position index 23 in a compressed form, the word-boundary-position index 23 can be made compact in size.

In the following, a second embodiment of the present invention will be described. In this description, the same elements as those of the previous embodiments are referred to by the same numerals, and description thereof will be omitted. The second embodiment is directed to a variation of compression that is applied to information recorded in the word-boundary-position index 23 of the document-retrieval apparatus 1.

In the Japanese language, an average length of words is about 2 to 3 characters. The longer the document, the larger the number of occurrences in the document is. If the query word appears near the end of the document, the method of the first embodiment requires expansion of a large data amount in order to check whether the position of occurrence of the query word matches the word boundary. This results in a lengthy search time. In the second embodiment, therefore, the compressed information (indicative of the positions of occurrences) is divided into blocks, so as to reduce the load of expansion processing, thereby improving search speed.

Figure 7:
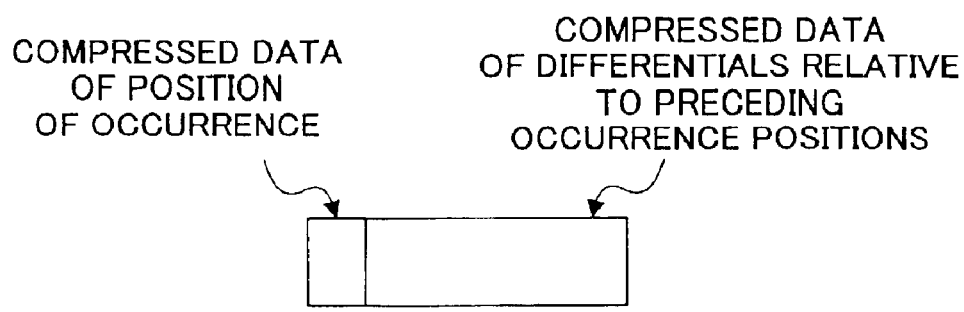
FIG. 7 is an illustrative drawing of compressed information indicative of the positions of occurrences according to a second embodiment.

FIG. 7 is an illustrative drawing of compressed information (indicative of the positions of occurrences) according to the second embodiment. As shown in FIG. 7, the positions of occurrences recorded in the word-boundary-position index 23 of the document-retrieval apparatus 1 are compressed by use of fixed-length blocks according to the second embodiment. The first portion of a block records the position of occurrence in a compressed form without taking differential relative to the preceding occurrence position, and the remaining portion of the block records the differentials relative to the preceding occurrence positions in a compressed form. The differentials are inserted into the block as much as possible. Here, the total number of blocks can be easily identified by recording the number of blocks in the compressed form. Alternatively, the number of bits used for representing the positions of occurrences in the compressed form may be recorded, so as to allow the number of blocks to be readily obtained from the block size.

Figure 8:
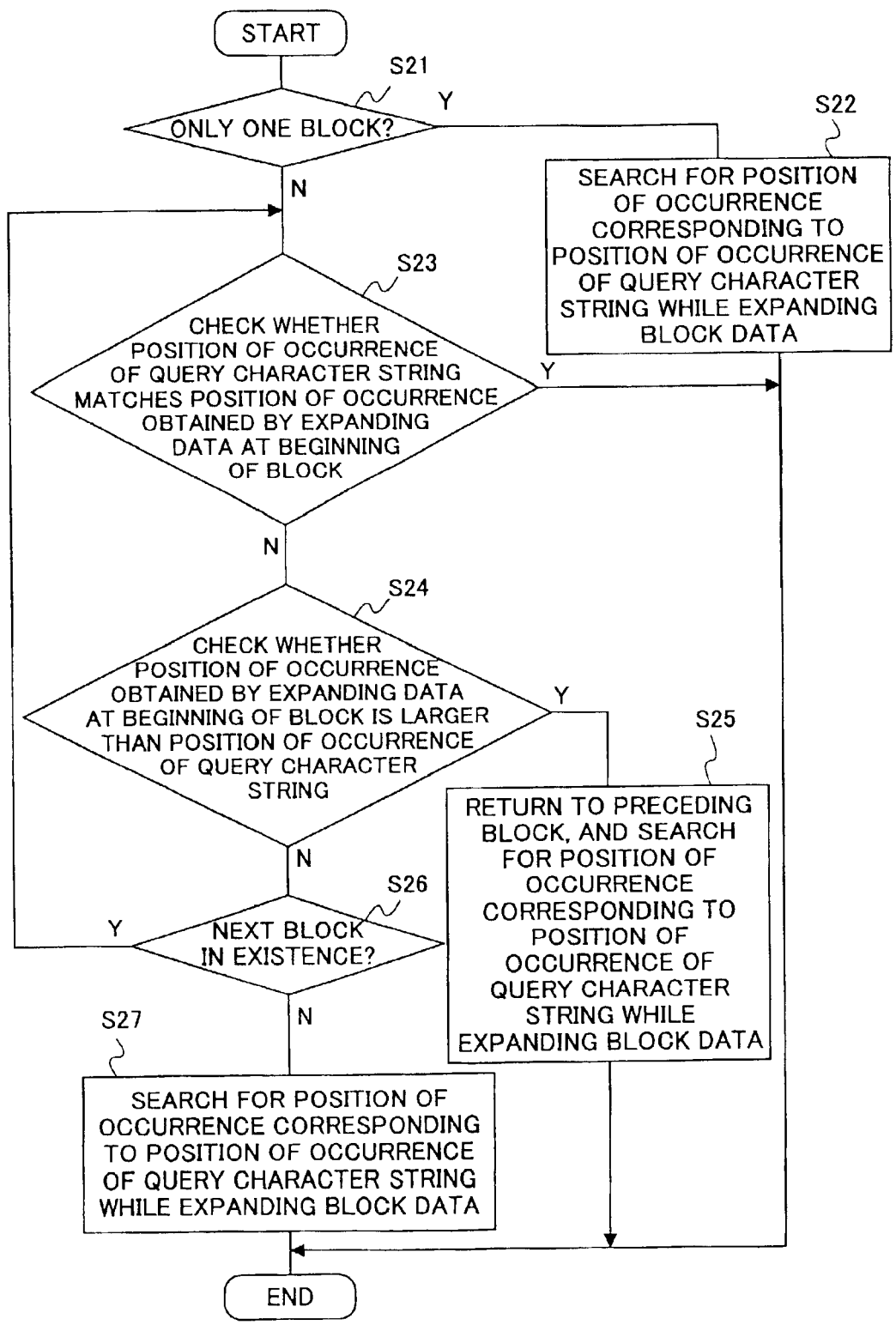
FIG. 8 is a flowchart of a process of finding the position of occurrence in a word-boundary-position index that corresponds to the position of occurrence of a query character string found by an n-gram-index search.

FIG. 8 is a flowchart of a process of finding the position of occurrence in the word-boundary-position index that corresponds to the position of occurrence of a query character string found by an n-gram-index search, as was described in connection with step S15 of FIG. 6.

At step S21, a check is made as to whether there is only one block or there are two or more blocks.

At step S22, if there is only one block (Y at step S21), the position of occurrence corresponding to the position of occurrence of a query character string is searched for while expanding the data of the block at the same time. The procedure then comes to an end (with or without the position of occurrence being found).

At step S23, if there are two or more blocks (N at step S21), a check is made as to whether the position of occurrence obtained by expanding data at the beginning of a current block is the same as the position of occurrence of the query character string. If there is a match (Y at step S23), the procedure comes to an end.

If there is no match (N at step S23), a check is made at step S24 as to whether the position of occurrence obtained by expanding data at the beginning of the current block is larger the position of occurrence of the query character string. If the answer is yes (Y at step S24), the procedure goes to step S25.

At step S25, the preceding block is treated as a current block since the position of occurrence must be located in the preceding block. The position of occurrence corresponding to the position of occurrence of a query character string is searched for while expanding the data of the current block at the same time. The procedure then comes to an end (with or without the position of occurrence being found).

If the position of occurrence obtained by expanding data at the beginning of the current block is not larger the position of occurrence of the query character string (N at step S24), a check is made at step S26 as to whether there is a next block. If there is a next block (Y at step S26), the procedure goes back to step S23.

If the current block is the last block (N at step S26), it is ascertained that the position of occurrence of the query character string must be located in the current block. At step S27, thus, that the position of occurrence corresponding to the position of occurrence of the query character string is searched for while expanding the data of the current block at the same time. The procedure then comes to an end (with or without the position of occurrence being found).

In the process as described above, only the data at the beginning of a block is expanded until the block is identified that has the possibility of the position of occurrence of the query character string being included therein. The amount of data needing expansion can thus be reduced.

Figure 9:
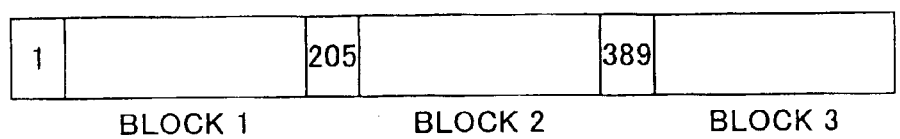
FIG. 9 is an illustrative drawing showing an example of the word-boundary-position index.

For example, FIG. 9 shows a case in which the positions of occurrences are (1, 3, . . . , 203, 205, . . . , 385, 388, . . . , 450, 452, . . . 500), and are compressed in three separate blocks having the fixed block length. In FIG. 9, for the sake of simplicity of explanation, the position of occurrence at the beginning of each block is shown in a non-compressed form. If the word "tai den" appears at a position "450", for example, it is easy to tell that the position "450" is located in the block BLOCK3. In this case, the blocks BLOCK1 and BLOCK2 will only be inspected in respect of the position of occurrence at the beginning thereof.

In this manner, the positions of occurrences that indicate word boundaries in the document are recorded in blocks. With this provision, a time required for expansion can be shortened, and the search speed can be increased, compared with the case in which the information is compressed in a straightforward manner that requires a lengthy expansion process at the time of search.

Further, a block includes compressed data indicative of the position of first occurrence within the block, and includes compressed data indicative of differentials between given positions and preceding positions with respect to occurrences other than the first occurrence in the block. Until the block with the possibility of the position of occurrence being included therein is identified, only the first position of occurrence can be expanded in each block. This reduced the amount of data that needs to be expanded.

Figure 10:
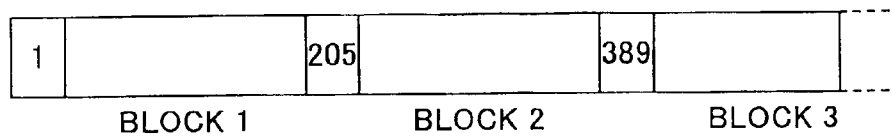
FIG. 10 is an illustrative drawing showing the use of the last block having a shorter length.

In this embodiment, blocks having the fixed length are used in which differentials between the positions of occurrences and the positions of preceding occurrences are recorded in a compressed form. Alternatively, the last block may be given a length shorter than the fixed length (i.e., the length that is required to contain the remaining positions of occurrences in a compressed form). This further reduces the size of indexes. FIG. 10 is an illustrative drawing showing the use of the last block having a shorter length.

In the following, a third embodiment of the present invention will be described. The third embodiment is directed to a variation of compression that is applied to the information recorded in the word-boundary-position index 23 of the document-retrieval apparatus 1.

According to the method of information compression used in the second embodiment, the first data of a block needs to be expanded in order to identify a block that has the possibility of the position of occurrence of the query character string being included therein. In some cases, further, the procedure needs to go back to a preceding block. These factors work to hinder the speed of search. In consideration of this, the third embodiment is aimed at achieving a further improvement in search speed.

Figure 11:
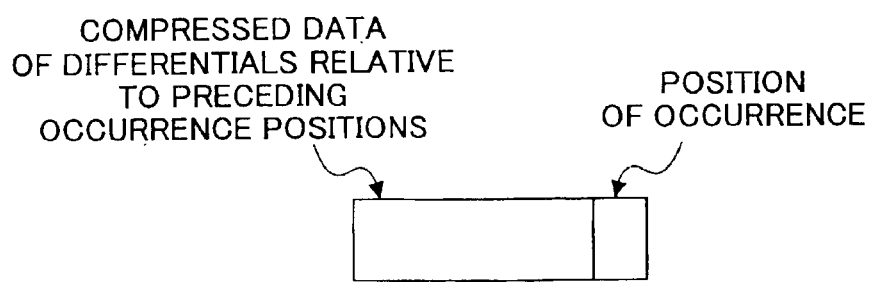
FIG. 11 is an illustrative drawing for explaining compressed information according to a third embodiment.

FIG. 11 is an illustrative drawing for explaining compressed information according to the third embodiment. As shown in FIG. 11, the positions of occurrences recorded in the word-boundary-position index 23 of the document-retrieval apparatus 1 are compressed by use of blocks according to the third embodiment. The first portion of a block records differentials relative to the positions of preceding occurrences in a compressed form, and the remaining portion that is the last portion of the block records the position of occurrence in a non-compressed form without taking a differential relative to the preceding occurrence position. The differentials are inserted into the block as much as possible.

Figure 12:
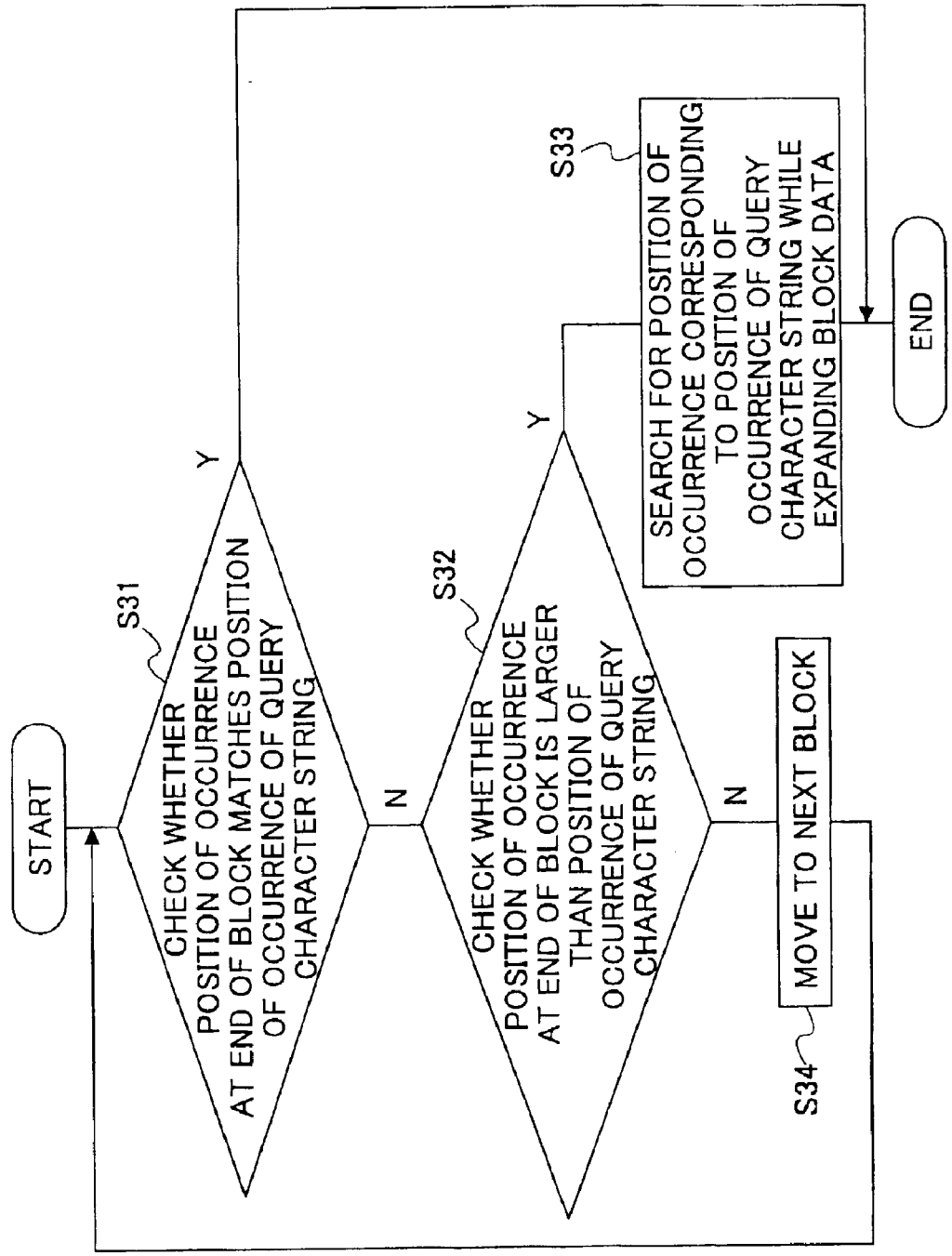
FIG. 12 is a flowchart of a process of finding the position of occurrence in the word-boundary-position index that corresponds to the position of occurrence of a query character string found by an n-gram-index search.

FIG. 12 is a flowchart of a process of finding the position of occurrence in the word-boundary-position index that corresponds to the position of occurrence of a query character string found by an n-gram-index search, as was described in connection with step S15 of FIG. 6.

At step S31, a check is made as to whether the position of occurrence at the end of a current block is the same as the position of occurrence of a query character string. If there is a match (Y at step S31), the procedure comes to an end.

If there is no match (N at step S31), a check is made at step S32 as to whether the position of occurrence at the end of the current block is larger the position of occurrence of the query character string. If the answer is yes (Y at step S32), the procedure goes to step S33.

At step S33, it is ascertained that the position of occurrence of the query character string, if any, must be located in the current block, so that the position of occurrence corresponding to the position of occurrence of the query character string is searched for while expanding the data of the current block at the same time. The procedure then comes to an end (with or without the position of occurrence being found).

If the position of occurrence at the end of the current block is not larger the position of occurrence of the query character string (N at step S32), the procedure goes to step S34.

At step S34, a next-block is treated as a current block, and the procedure goes back to step S31.

The position of occurrence of the query character string is always smaller than the position of occurrence at the end of the last block, so that the procedure described above comes to an end without failure. Further, if the current block is the last block, the procedure comes to an end at step S31 or at step S33 via step S32. At step S34, therefore, a next block is in existence without an exception.

Figure 13:
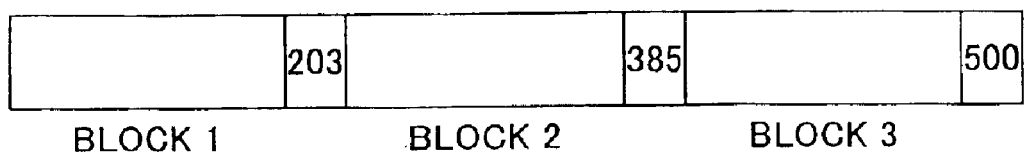
FIG. 13 is an illustrative drawing showing an example of the word-boundary-position index.

For example, FIG. 13 shows a case in which the positions of occurrences are (1, 3, . . . , 203, 205, . . . , 385, 388, . . . , 450, 452, . . . 500), and are compressed in three separate blocks. If the word "tai den" appears at a position "450", for example, it is easy to tell that the position "450" is located in the block BLOCK3 that has the position of occurrence at its end is 500. In this case, there is no need to expand data of the blocks BLOCK1 and BLOCK2.

A block includes non-compressed data indicative of the position of last occurrence within the block, and includes compressed data indicative of differentials between given positions and preceding positions with respect to occurrences other than the last occurrence in the block. Since the position of the last occurrence in the block that is not a differential is recorded without compression, a further improvement in search speed can be made.

In the following, a fourth embodiment of he present invention will be described. The fourth embodiment is directed to a variation of compression that is applied to the information recorded in the word-boundary-position index 23 of the document-retrieval apparatus 1.

According to the information compression method of the third embodiment, the position of occurrence at the end of each block is recorded without compression, thereby making it easier to perform a matching process for a query character string. However, the amount of data required to represent the position of occurrence is undesirably increased. The fourth embodiment reduces the data amount while improving the search speed.

Figure 14:
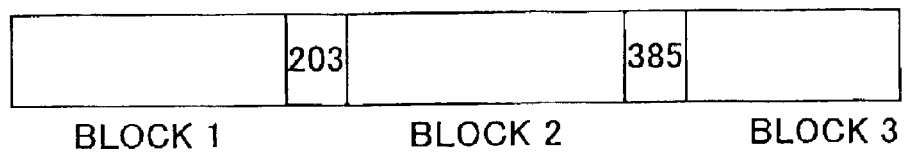
FIG. 14 is an illustrative drawing for explaining compressed information according to a fourth embodiment.

FIG. 14 is an illustrative drawing for explaining compressed information according to the fourth embodiment. As shown in FIG. 14, the positions of occurrences recorded in the word-boundary-position index 23 of the document-retrieval apparatus 1 are compressed by use of blocks according to the fourth embodiment. The first portion of a block records differentials relative to the positions of preceding occurrences in a compressed form, and the remaining portion that is the last portion of the block records the position of occurrence in a non-compressed form without taking a differential relative to the preceding occurrence position. The differentials are inserted into the block as much as possible. In this embodiment, the position of occurrence at the end of a block is not provided in the last block.

FIG. 15 is a flowchart of a process of finding the position of occurrence in the word-boundary-position index that corresponds to the position of occurrence of a query character string found by an n-gram-index search, as was described in connection with step S15 of FIG. 6.

At step S41, a check is made as to whether the current block is the last block. If it is the last block (Y at step S41), the position of occurrence corresponding to the position of occurrence of a query character string is searched for while expanding the data of the current block as the search proceeds (step S42). The procedure then comes to an end, no matter whether the position of occurrence is found or not found.

If the current block is not the last block (N at step S41), the procedure goes to step S43.

At step S43, a check is made as to whether the position of occurrence at the end of a current block is the same as the position of occurrence of the query character string. If there is a match (Y at step S43), the procedure comes to an end.

If there is no match (N at step S43), a check is made at step S44 as to whether the position of occurrence at the end of the current block is larger the position of occurrence of the query character string. If the answer is yes (Y at step S44), the procedure goes to step S45.

At step S45, it is ascertained that the position of occurrence of the query character string, if any, must be located in the current block, so that the position of occurrence corresponding to the position of occurrence of the query character string is searched for while concurrently expanding the data of the current block as the search proceeds The procedure then comes to an end (with or without the position of occurrence being found).

If the position of occurrence at the end of the current block is not larger the position of occurrence of the query character string (N at step S44), the procedure goes to step S46.

At step S46, a next block is treated as a current block, and the procedure goes back to step S41.

If the current block is the last block, the procedure comes to an end at step S41. At step S46, therefore, a next block is in existence without an exception.

In the embodiment described above, the position of occurrence at the end of a block is not provided in the last block. This makes it possible to reduce the data amount while improving the search speed In the embodiments described above, a coding method that is tailored to the distribution of data to be compressed may preferably used to reduce the size of the indexes 22 and 23. In the case of the word-boundary-position-index 23, for example, the differentials of occurrence positions represent the lengths of words, so that these differentials tend to have a concentrated distribution falling within a narrow range. On the other hand, n-grams of the n-gram index 22 tend to have random positions of occurrence, so that the differentials of occurrence positions tend to have a broad distribution covering a wide range. Accordingly, different coding methods may be used for the n-gram index 22 and the word-boundary-position index 23, respectively, thereby achieving efficient coding.

Further, the present invention is not limited to these embodiments, but various variations and modifications may be made without departing from the scope of the present invention.

The present application is based on Japanese priority application No. 2001-243854 filed on Aug. 10, 2001, with the Japanese Patent Office, the entire contents of which are hereby incorporated by reference.

What is claimed is:

1. A document retrieval apparatus for retrieving a document including a query character string among a plurality of registered documents, comprising:

a text separating unit which separates the registered documents and a query character string into n-grams and words;

an n-gram index which stores therein information about occurrences of n-grams appearing in the registered documents on a n-gram-specific basis;

a word-boundary-position index which stores therein information about occurrences of word boundaries appearing in the registered documents in a compressed form;

a character-string-based search unit which identifies one or more registered documents including the query character string by looking up one or more n-grams of the query character string in said n-gram index; and a word-based search unit which checks whether the query character string appears as word in said one or more identified registered documents by looking up one or more words of the query character string in said word-boundary-position index, thereby identifying a registered document including the query character string as word.

2. The document retrieval apparatus as claimed in claim 1 wherein said word-boundary-position index is comprised of a plurality of blocks that separately contain positions of the occurrences of word boundaries in the compressed form.

3. The document retrieval apparatus as claimed in claim 2, wherein the plurality of blocks have a fixed block length.

4. The document retrieval apparatus as claimed in claim 2, wherein the plurality of blocks have a fixed block length, except for a block positioned last in a series of the plurality of blocks that has a length less than the fixed block length.

5. The document retrieval apparatus as claimed in claim 2, wherein each block includes compressed data of a position of a given occurrence and compressed data of differentials between occurrence positions and preceding occurrence positions with respect to occurrences other than the given occurrence, said given occurrence being either a first occurrence in the block or a last occurrence in the block.

6. The document retrieval apparatus as claimed in claim 2, wherein each block includes non-compressed data of a position of a given occurrence and compressed data of differentials between occurrence positions and preceding occurrence positions with respect to occurrences other than the given occurrence, said given occurrence being either a first occurrence in the block or a last occurrence in the block.

7. The document retrieval apparatus as claimed in claim 2, wherein each block includes data of a position of a last occurrence in the block and compressed data of differentials between occurrence positions and preceding occurrence positions with respect to occurrences other than the last occurrence, except for a last block that is not provided with the data of a position of a last occurrence.

8. The document retrieval apparatus as claimed in claim 1, wherein said n-gram index stores therein the information about occurrences of n-grams in a compressed form that is obtained by applying a coding method different from a coding method applied to said word-boundary-position index.

9. A method of retrieving a document including a query character string among a plurality of registered documents, comprising the steps of:

- separating the registered documents and a query character string into n-grams and words;
- storing, in an n-gram index, information about occurrences of n-grams appearing in the registered documents on a n-gram-specific basis;
- storing, in a word-boundary-position index, information about occurrences of word boundaries appearing in the registered documents in a compressed form;
- identifying one or more registered documents including the query character string by looking up one or more n-grams of the query character string in said n-gram index; and
- checking whether the query character string appears as word in said one or more identified registered documents by looking up one or more words of the query character string in said word-boundary-position index, thereby identifying a registered document including the query character string as word.

10. A computer-readable record medium having a program embodied therein causing a computer to retrieve a document including a query character string among a plurality of registered documents, said program comprising the steps of:

- separating the registered documents and a query character string into n-grams and words;
- storing, in an n-gram index, information about occurrences of n-grams appearing in the registered documents on a n-gram-specific basis;
- storing, in a word-boundary-position index, information about occurrences of word boundaries appearing in the registered documents in a compressed form;
- identifying one or more registered documents including the query character string by looking up one or more n-grams of the query character string in said n-gram index; and
- checking whether the query character string appears as word in said one or more identified registered documents by looking up one or more words of the query character string in said word-boundary-position index, thereby identifying a registered document including the query character string as word.

* * * * *